Aug. 12, 1924.                     1,504,828
W. G. MOORE ET AL
PNEUMATIC BUMPER
Filed July 30, 1923
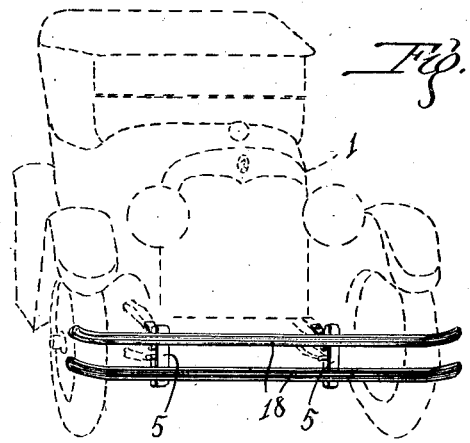
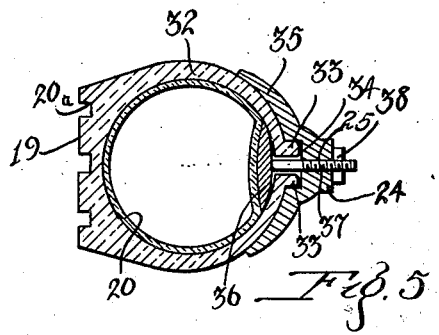
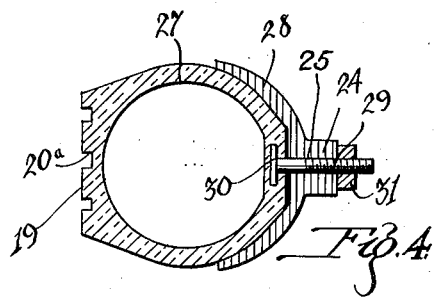
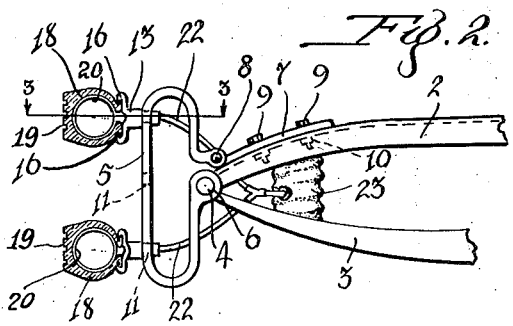
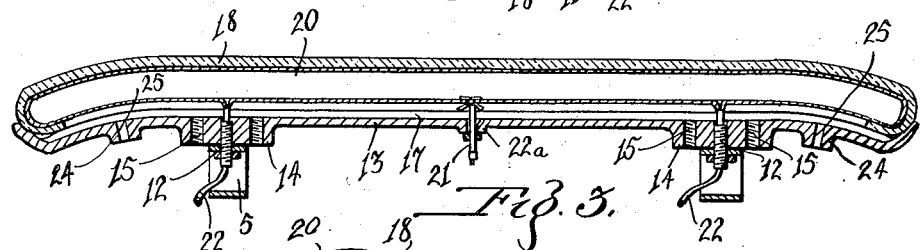
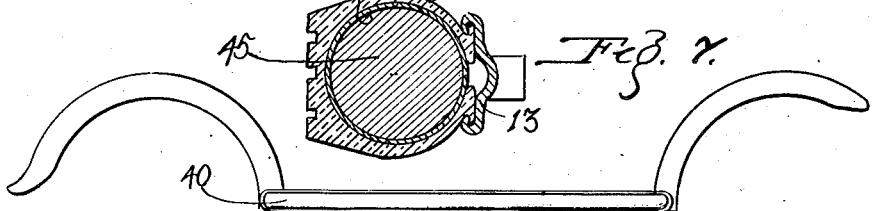
INVENTORS
W. G. Moore
J. E. Wood
BY
Munn & Co.
ATTORNEYS Patented Aug. 12, 1924.

1,504,828

UNITED STATES PATENT OFFICE.

WALTER G. MOORE AND JOSEPH E. WOOD, OF CHICAGO, ILLINOIS.

PNEUMATIC BUMPER.

Application filed July 30, 1923. Serial No. 654,726.

*To all whom it may concern:*

Be it known that we, WALTER G. MOORE and JOSEPH E. WOOD, both citizens of the United States, and residents of Chicago, in the county of Cook and State of Illinois, have invented a new and useful Improvement in Pneumatic Bumpers, of which the following is a full, clear, and exact description.

Our invention relates to improvements in pneumatic bumpers, and it consists in the combinations, constructions, and arrangements herein described and claimed.

An object of our invention is to provide a bumper of the character described in which means is provided for maintaining the vertical alinement of a plurality of bumper bars.

A further object of our invention is to provide a bumper of the character described having a high degree of resiliency which precludes to a great extent the sliding of the bumper upon contact with an object, such as another vehicle, road post, etc.

A further object of our invention is to provide a device of the character described in which novel means is employed for absorbing a great deal of the shock transmitted from the bumper through the frame of the car.

Other objects and advantages will appear in the following specification, and the novel features of the invention will be particularly pointed out in the appended claims.

Our invention is illustrated in the accompanying drawings, forming part of this application, in which Figure 1 is a perspective view of an embodiment of our invention, Figure 2 is a view partly in section of the mechanism illustrated in Figure 1, Figure 3 is a sectional view along the line 3—3 of Figure 2, Figure 4 is a sectional view of a modified form of our invention, Figure 5 is a sectional view of a modified form of our invention, Figure 6 is a side elevation of a modified form of our invention, and Figure 7 is still another modified form of our invention.

In carrying out our invention, we make use of the ordinary type of motor vehicle 1 having a chassis frame 2 and springs 3 pivotally attached to the frame 2 by means of a spring bolt 4. This construction is cited as the most ordinary construction employed in the modern motor vehicle of today. Our improved pneumatic bumper is attached to the car by means of a pair of supporting frames 5. These frames are more clearly illustrated in Figure 2 and consist in elongated loop-shaped metal members having an eye portion 6 arranged to engage with the shackle bolt 4 and pivotally supports one end of the loop-shaped member 5 thereupon.

A binder plate 7 is hingedly secured to the opposite end of the loop-shaped member 5 at 8. This binder plate is provided with a pair of holes through which bolts 9 are projected and arranged to pass through holes drilled in the frame 2. The location of the holes in the frame 2 is determined in the following manner. The eye portion 6 is first secured to the spring bolt 4 and the binder plate 7 is laid upon the upper surface of the frame 2 and moved longitudinally of the frame until the front surface of the loop-shaped member 5 is lying in a vertical plane. The holes in the frame 2 are then drilled in registration with the holes in the binder plate 7 and the bolts 9 are projected therethrough and secured by means of suitable nuts 10. It will thus be seen that we provide a pair of loop-shaped or supporting members 5, one for each of the front springs, as illustrated in Figure 1. It will of course be understood that the same or similar construction may be employed for the rear portion of the vehicle.

The loop-shaped portion 5 is provided with three holes 11 therethrough, one at each end and one in the exact center of the forward wall of the loop-shaped member. These openings 11 are for the purpose of engaging with hollow stud bolts 12 carried by a bumper frame 13 so as to support the frame 13 in a horizontal position directly in front of the loop-shaped portion 5. One, two, or three of the frames 13 may be employed simultaneously, depending entirely upon the wishes of the owner of the vehicle.

The bumper frame 13 has a pair of boss portions 14 through which three threaded bores 15 are disposed. In the present assembly we choose to employ the center of the threaded bores 15 for the reception of the hollow stud bolts 12. The purpose of course in having three of these threaded bores 15 is to adapt the bumper frame to motor vehicles having various widths of chassis.

The bumper frame 13 is provided with a pair of clincher side walls 16 constructed precisely in the same fashion as the ordinary type of clincher tire rim. The frame 13 is further provided with a cavity 17 extending the entire length of the frame at substantially its mid point.

A vulcanized rubber casing 18, having a substantially flat work engaging portion 19 and constructed in the manner of the ordinary type of clincher tire, is received on the bumper frame 13 so that its clincher side walls may engage with the walls 16 of the frame 13. A pneumatic tube 20 is disposed within the casing 18 and the inlet valve 21 therefore is projected through an aperture 22$^a$ in the rear wall of the bumper frame 13.

The pneumatic tube 20, however, is not constructed after the fashion of an ordinary pneumatic tube, in that, like the casing, it is not endless and also that it is provided with a pair of flexible ducts or passages 22 communicating therewith and which are adapted to pass through the hollow stud bolts 12. These ducts 22 communicate with a pneumatic cushion 23 disposed between the frame 2 and the spring 3 so that movement of the spring toward the frame, as in the case of a severe road shock or contact of the bumper with another object, will cause the air cushion 23 to be compressed and to increase the pressure of the air in the pneumatic tube 20. Likewise, compression of the air in the tube 20 by contact of the bumper with an object, will tend to force the spring 3 from the frame 2. The direction in which the air will travel through the ducts 22 depends entirely upon the particular nature of the contact of the bumper casings 18 with an object. It will be understood that the ducts 22 at one end of the pneumatic tube 20 have a pair of bumper casings 18 which are shown in Figure 2 and are connected to the air cushion 23 adjacent that end or side of the frame, and that the ducts 22 at the opposite end of the casing are connected with their adjacent air cushion 23 at the adjacent side of the chassis.

The bumper supporting frame 13 is further provided with a pair of bossed portions 24, one adjacent each end thereof, having passages 25 therethrough. The purpose of these bosses and the passages 25 is for securing the casing 18 against dislodgment from the bumper when other than the ordinary clincher type of casing is employed.

From the foregoing description of the various parts of the device, the operation thereof may be readily understood. Let us assume that a motor vehicle equipped with our improved device collides with another vehicle upon the road but which is not equipped with bumpers. The impact of the collision will be evenly distributed over the entire area of the bumper casings 18. This is due to the fact that the air within the tubes 20 is compressed uniformly even though the casing contacts the object or vehicle at one or two points. The semi-rigid type of bumper does not possess this capacity for the distribution of impact, except to a relatively slight degree. The result will be that the occupants of the vehicle equipped with our improved bumpers will not receive a shock from the collision.

A further and most important advantage is that no great damage will be done to the vehicle colliding with it even though the finish of that vehicle be of a highly polished type. This is due to the fact that the contacting and work engaging surfaces of the bumper are rubber and not metal which scratches and otherwise mars the finish of the fenders by contact therewith. Rubber will yield and does not scratch. If the impact of the collision is sufficiently strong, the tubes 20 will be compressed and air will pass through the ducts 22 and into the air cushion 23, thereby separating the springs 3 and the frame 2 and distributing a portion of the shock over the springs and frame by virtually lifting the car. It will be noted of course that while we have shown two of the bumper frames 13 with their associate casings and tubes 20 and 22, respectively, that three may be employed as well as two, or even one. This matter is entirely to the option of the driver of the motor vehicle and may be accomplished at his will, since there are no special tools or instruments necessary for attaching the frame 13 to the loop-shaped supporting members 5.

In Figure 4 we have shown a modified form of the pneumatic casing in which we employ a single casing 27. This casing has a tread portion 19 precisely identical with the tread portion on the casing 18 having longitudinal grooves 20$^a$ to enhance the appearance of the casing as well as the gripping qualities which prevent slipping of the bumper over the object collided with. The casing 27 is secured to a supporting frame 28 somewhat similar to the frame 13 but not provided with clincher sides. The cross section of the member 28 is substantially arcuate. The boss portions 24 having the passages or apertures 25 therethrough are employed on the member 28, and bolts 29 are projected therethrough. The heads of the bolts 29, as shown at 30, are embedded in the inner wall of the casing 27, and nuts 31 are provided to draw the bolts 29 so that the casing 27 is held in close contact with the inner walls of the supporting member 28. This type of casing is particularly well adapted for small vehicles in which economy of construction is a prime object. The operation of this modified form is precisely similar to the preferred form of the device.

In Figure 5 we have shown still another modified form of our invention in which we employ a straight side casing 32 having a face portion 19 and in which outwardly extending longitudinal flanges 33 are provided at the adjacent edges of the casing. These flanges 33 are arranged to lie in a cavity 34 of a supporting member 35 similar in construction to the supporting member 28, but having the cavity 34 as shown. In this form of our invention, the casing 32 is held to the member 35 by means of a metal strip 36 extending longitudinally within the casing and having integral stud bolts 37 arranged to project through the passages 25 of the bosses 24. Nuts 38 are employed to hold the stud bolts 37 in close engagement with the member 35 and thereby retain the casing 32 against dislodgment. The casing 32 is provided with an inner pneumatic tube 20 similar to the tube employed in the preferred form of the device. The operation of this modified form is also similar to the operation of the preferred form.

In Figure 6 we have shown still another modified form of our invention in which a pneumatic casing 40, preferably of the clincher type, is held by means of a supporting member 41 directly to the side walls of the running board 42 of the motor vehicle. This type of pneumatic bumper is employed to obviate the damage done by contact of one vehicle with another while passing and broad side collision.

Obviously our invention may operate successfully without the use of the air cushion 23 and the ducts 22, since the pneumatic tubes with their associate casings are sufficiently resilient and durable enough to stand the impact of severe shock without damage thereto.

In Figure 7 we have shown the tube 20 supplied with a filler 45 which may be any one of the ordinary types of fillers employed to obviate the use of air alone in the tube. These fillers are ordinarily composed of a porous rubber composition. It should be understood of course that we deem the use of any ordinary rubber casing having a resilient filler entirely within the spirit and scope of our invention.

We claim:

1. A bumper of the character described comprising a pneumatic casing, means for supporting said casing upon a motor vehicle, whereby said casing may absorb the shocks from the impact of said vehicle with other objects, and other means associated with said casing and with the springs and chassis of said motor vehicle for distributing the pressure from said pneumatic casing to points between the spring and frame of said vehicle.

2. A bumper of the character described comprising a pneumatic casing, means for supporting said casing in a substantially horizontal plane on a motor vehicle, an air cushion adapted to be disposed between the springs and the frame of said motor vehicle, and an air passage communicating at one end with said air cushion and with said pneumatic casing at the opposite end, whereby air under pressure may pass from said air cushion to said pneumatic casing.

3. In a bumper of the character described, a bumper bar supporting member comprising a substantially loop-shaped member adapted to be pivotally mounted at one end upon the spring connector bolt of a motor vehicle, and a hingedly mounted plate attached to the opposite end of said loop-shaped member, whereby said plate may be secured by any ordinary securing means to the frame of said motor vehicle.

4. A bumper of the type described comprising a pair of bumper bar supporting members substantially loop-shaped in contour adapted to be pivotally mounted at one end upon the spring bolts of a motor vehicle, hingedly mounted plates attached to the opposite end of said loop-shaped members, whereby said plates may be secured by any ordinary securing means to the frame of said vehicle, and parallel bumper bars disposed transversely thereacross.

WALTER G. MOORE.
JOSEPH E. WOOD.